United States Patent
Daetz et al.

(10) Patent No.: US 11,620,376 B2
(45) Date of Patent: Apr. 4, 2023

(54) SYSTEM AND METHODS FOR GENERATING AND AUTHENTICATING DYNAMIC USERNAMES REPLICATION

(71) Applicant: Mastercard International Incorporated, Purchase, NY (US)

(72) Inventors: Marthom Daetz, O'Fallon, MO (US); Tara L. Sauer, O'Fallon, MO (US)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 17/524,137

(22) Filed: Nov. 11, 2021

(65) Prior Publication Data

US 2022/0067141 A1  Mar. 3, 2022

Related U.S. Application Data

(62) Division of application No. 16/379,923, filed on Apr. 10, 2019, now Pat. No. 11,194,897.

(51) Int. Cl.
| | |
|---|---|
| *G06F 21/46* | (2013.01) |
| *G06F 21/31* | (2013.01) |
| *H04L 67/30* | (2022.01) |
| *H04L 67/306* | (2022.01) |
| *G06F 3/04817* | (2022.01) |
| *G06F 16/245* | (2019.01) |
| *G06F 16/9535* | (2019.01) |

(52) U.S. Cl.
CPC .......... *G06F 21/46* (2013.01); *G06F 3/04817* (2013.01); *G06F 16/245* (2019.01); *G06F 16/9535* (2019.01); *G06F 21/31* (2013.01); *G06F 2221/2117* (2013.01); *H04L 67/30* (2013.01); *H04L 67/306* (2013.01)

(58) Field of Classification Search
CPC ...... G06F 21/31; G06F 21/46; G06F 16/9535; G06F 2221/2117; H04L 63/083; H04L 67/306; H04L 9/0863; H04L 63/10; H04W 12/06
See application file for complete search history.

(56) References Cited

U.S. PATENT DOCUMENTS 9,639,692 B1 * 5/2017 Xue .................... H04W 12/126
9,898,728 B2 * 2/2018 Brudnicki ............ G06Q 20/227
(Continued)

OTHER PUBLICATIONS

IBM, "Method for Creating Dynamic Username in a Shared Computing Environment", Aug. 9, 2006, pp. 1-3 (Year: 2006).*

*Primary Examiner* — Lizbeth Torres-Diaz
(74) *Attorney, Agent, or Firm* — Hovey Williams LLP

(57) ABSTRACT

A method for generating a dynamic username includes receiving a static component of a dynamic username and a selection of a dynamic parameter component of the dynamic username from a user. The static component and the selected dynamic parameter component are combined in a predetermined order, based on a user selected option. The dynamic username is produced from the combined static component and the selected dynamic parameter component based on the predetermined order. A rule for producing the dynamic username is generated. The rule defines the predetermined order of the static component and the selected dynamic parameter component. The static component and the rule are stored in a credential database with the rule being associated with the static component.

6 Claims, 15 Drawing Sheets

(56) References Cited

U.S. PATENT DOCUMENTS

| | | | |
|---|---|---|---|
| 10,698,794 B1* | 6/2020 | Ganesan | H04L 67/34 |
| 2006/0136738 A1* | 6/2006 | Bauchot | G06F 21/31 |
| | | | 713/183 |
| 2006/0248344 A1* | 11/2006 | Yang | G07C 9/33 |
| | | | 713/183 |
| 2009/0177694 A1* | 7/2009 | Olson | G06Q 10/10 |
| 2011/0321144 A1* | 12/2011 | Saxena | G06F 21/34 |
| | | | 726/6 |
| 2012/0210408 A1* | 8/2012 | Lu | H04L 9/3226 |
| | | | 726/6 |
| 2015/0047003 A1* | 2/2015 | Khan | H04L 63/08 |
| | | | 726/7 |
| 2015/0207790 A1* | 7/2015 | Lu | G06F 21/44 |
| | | | 726/9 |
| 2015/0249658 A1* | 9/2015 | Lee | G06F 21/31 |
| | | | 726/6 |
| 2016/0080366 A1* | 3/2016 | Agarwal | H04L 63/0838 |
| | | | 726/6 |
| 2017/0006012 A1* | 1/2017 | DeLuca | H04L 9/3297 |
| 2017/0177856 A1* | 6/2017 | Shetty | G06F 21/46 |
| 2017/0177857 A1* | 6/2017 | Shetty | G06F 16/90344 |
| 2018/0013758 A1* | 1/2018 | Yu | H04L 63/0846 |
| 2018/0054308 A1* | 2/2018 | Buck | G06Q 20/385 |
| 2018/0145957 A1* | 5/2018 | Kasibhatla | H04L 63/0846 |
| 2018/0285558 A1* | 10/2018 | Neumann | H04W 12/068 |
| 2019/0034614 A1* | 1/2019 | Liu | H04L 9/40 |
| 2019/0075103 A1* | 3/2019 | Li | H04L 63/0853 |
| 2020/0065472 A1* | 2/2020 | Son | H04L 63/0838 |
| 2020/0112585 A1* | 4/2020 | Keohane | H04L 9/3226 |
| 2020/0254878 A1* | 8/2020 | Pei | H04L 63/0838 |

\* cited by examiner

SYSTEM AND METHODS FOR GENERATING AND AUTHENTICATING DYNAMIC USERNAMES REPLICATION

CROSS-REFERENCE TO RELATED APPLICATIONS

This application is a divisional application of U.S. patent application Ser. No. 16/379,923 filed Apr. 10, 2019, which is incorporated herein by reference in its entirety.

FIELD OF THE DISCLOSURE

The field of the disclosure relates generally to user credentials for computer access and, more particularly, to systems and methods for generating and authenticating dynamic usernames.

BACKGROUND

Securing a computer system against unauthorized access is typically performed by assigning authorized users a username and a password. When registering for access to the system, the user and/or a system administrator selects a username and a password. Known systems utilize a static username (i.e., an unchanging username) and an associated password. Password requirements have become more stringent by system administrators because many users select easy to remember passwords that can be easily hacked. One common way to increase password security is to require users to select passwords having a minimum requirement set by the administrator, such as, at least eight (8) characters, at least one number, at least one uppercase letter, and/or at least one special character. Such passwords, however, have been historically easy to hack using various brute force methods.

Hashing a password with a salt and storing the subsequent hash in a database is often used to significantly increase the difficulty of hacking user's passwords. However, there exists methods that can still be used to hack the passwords. For example, rainbow table attacks may be used to attack hashed passwords. One method to further increase the security of passwords is to use random salts for each password. While generally effective, increases in computing power of computers still leaves these password databases vulnerable to attack. Hacked passwords, however, are useless to a hacker if the hacker cannot associate the password to a known username.

Static usernames are typically easy to find and may not even be encrypted. In addition, usernames are often stored in the same database file as the hashed password. Even if encrypted, because the usernames are static, a hacker may use the same methods described above to hack the usernames.

BRIEF DESCRIPTION

This brief description is not intended to identify essential features of the present invention and is not intended to be used to limit the scope of the claims. These and other aspects of the present invention are described below in greater detail.

In one aspect, a method for generating a dynamic username is provided. The method includes receiving a static component of a dynamic username and receiving a selection of a dynamic parameter component of the dynamic username. The method also includes combining the static component and the selected dynamic parameter component in a predetermined order and producing the dynamic username based on the predetermined order. Furthermore, the method includes generating a rule for producing the dynamic username. The rule defines the predetermined order of the static component and the selected dynamic parameter component. In addition, the method includes storing the static component and the rule in a credential database and associating, within the database, the rule with the static component.

In another aspect, a method for authenticating a dynamic username is provided. The method includes receiving, from a user, a dynamic username and searching a credential database using the dynamic username. The method also includes generating a search result from the search. The search result includes a static component of the dynamic username. The static component includes at least a portion of the dynamic username. The method further includes retrieving, from the credential database, a rule for producing the dynamic username using the static component and a dynamic parameter component. Moreover, the method includes producing a test username from the static component and the dynamic parameter component based on the retrieved rule. The method includes comparing the dynamic username to the test username and authenticating the dynamic username based on the dynamic username matching the test username.

In yet another embodiment, one or more non-transitory computer-readable storage media are provided. The computer-readable storage media includes computer-executable instructions embodied thereon, wherein when executed by at least one processor, cause the processor to receive a static component of a dynamic username and receive a selection of a dynamic parameter component of the dynamic username. The computer-executable instructions further cause the processor to combine the static component and the selected dynamic parameter component in a predetermined order. Moreover, the computer-executable instructions further cause the processor to produce the dynamic username based on the predetermined order and generate a rule for producing the dynamic username. The rule defines the predetermined order of the static component and the selected dynamic parameter component. In addition, the computer-executable instructions cause the processor to store the static component and the rule in a credential database and associate, within the database, the rule with the static component.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
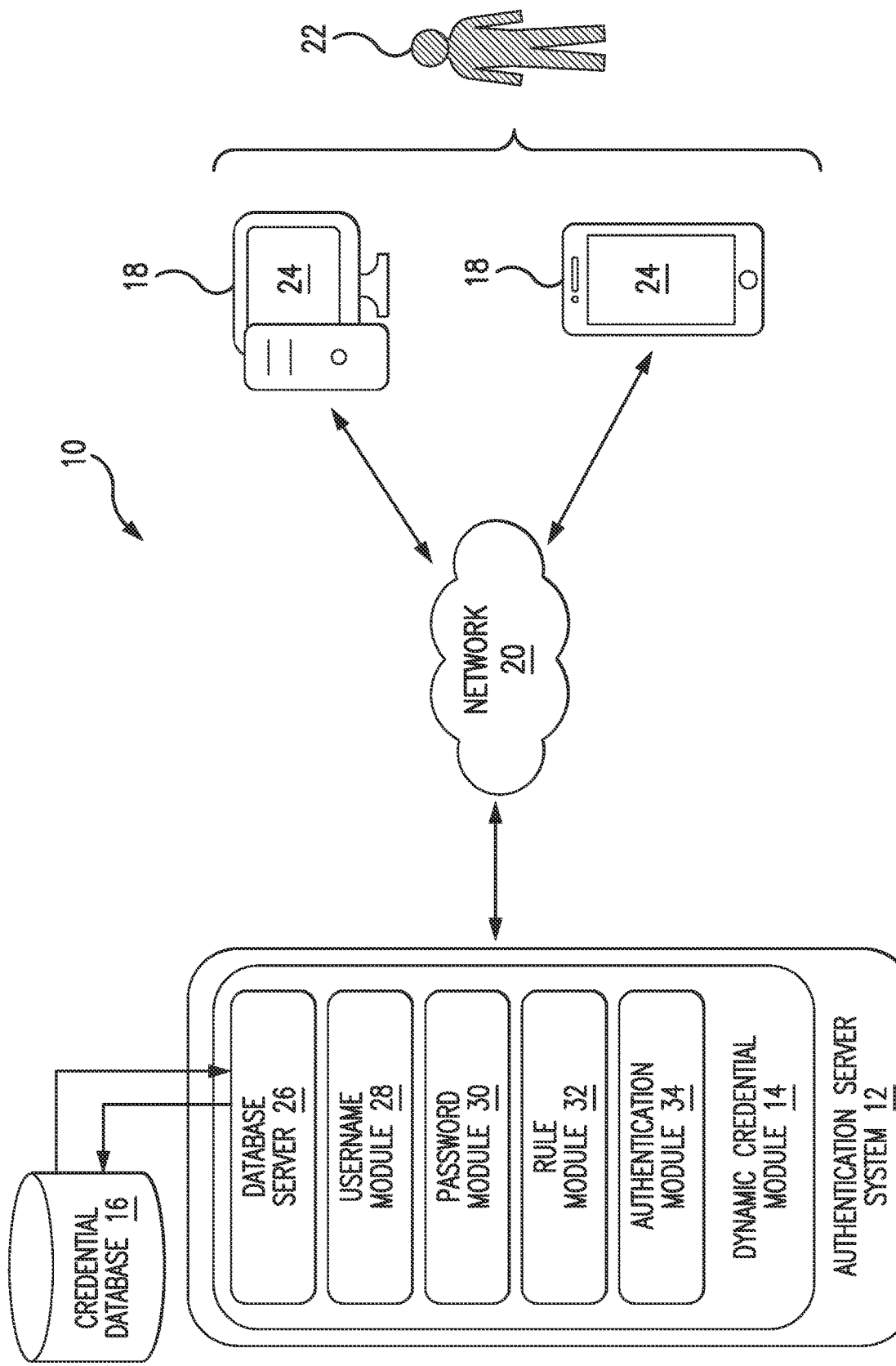
FIG. 1 is a block diagram of an example dynamic credential authentication system in accordance with one embodiment of the disclosure.

The figures depict exemplary embodiments for purposes of illustration only. The figures are not intended to limit the present invention to the specific embodiments they depict. One skilled in the art will readily recognize from the following discussion that alternative embodiments of the systems and methods illustrated herein may be employed without departing from the principles of the invention described herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled. It is contemplated that the disclosure has general application to generating and utilizing dynamics in login credentials for computer access in industrial, commercial, and residential applications.

Embodiments of the present technology relate to systems, computer-readable media, and computer-implemented methods for generating and utilizing dynamic usernames and/or passwords. Embodiments of the present technology provide increased security for users accessing computing systems, facilitate deterring fraud, and prevent hackers from impersonating users.

According to one embodiment of the disclosure, an authentication server system receives a static component of a dynamic username and receives a selection of a dynamic parameter component of the dynamic username from a user. The system combines the static component and the selected dynamic parameter component in a predetermined order and produces a dynamic username based on the predetermined order. Furthermore, the system generates a rule for producing the dynamic username. The rule defines the predetermined order of the static component and the selected dynamic parameter component. In addition, the system stores the static component and the rule in a credential database and associates the rule with the static component.

The methods and systems described herein may be implemented using computer programming or engineering techniques including computer software, firmware, hardware, or any combination or subset therefor. At least one of the technical problems addressed by this system includes: (i) having easily determined static usernames for users accessing computing systems; (ii) limiting brute force attacks against a computing system using a known username; and (iii) deterring fraud and preventing impersonation of users by fraudsters.

A technical effect of the systems and methods described herein is achieved by performing at least one of the following operations: (i) receiving a static component of a dynamic username; (ii) receiving a selection of a dynamic parameter component of the dynamic username; (iii) combining the static component and the selected dynamic parameter component in a predetermined order; (iv) producing the dynamic username based on the predetermined order; (v) generating a rule for producing the dynamic username; (vi) storing the static component and the rule in a credential database; and (vii) associating, within the database, the rule with the static component.

The resulting technical effect achieved by the systems and methods described herein is at least one of: (i) providing a dynamic username that changes based on user-selected criteria; and (ii) determining the dynamic username during access to the computing system so the username is not stored in a database.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

As will be appreciated, based on the description herein, the technical improvement in user credentials having a dynamic username as described is a computer-based solution to a technical deficiency or problem that is itself rooted in computer technology (i.e., the problem itself derives from the use of computer technology). More specifically, the technical problems created by conventional user credentialing, user authentication systems, and related methods are the result of an implementation and use of computers in those authentication systems and methods. The present invention improves upon the conventional methods and systems in the manners described herein. Thus, the inefficiencies or technical problems created by the conventional authentication systems and methods as described herein are solved by the methods and systems described and particularly claimed herein.

Dynamic Credential Authentication System

FIG. 1 is a block diagram of an example dynamic credential authentication system 10, in accordance with one embodiment of the disclosure. In the exemplary embodiment, the dynamic credential authentication system 10 includes an authentication server system 12 having a dynamic credential module 14, a credential database 16, and one or more client systems 18 coupled in communication via a network 20. The authentication server system 12 is a specially programmed computer system that enables a user 22 to implement auto-updating, dynamic login credentials to facilitate identifying and authenticating the user 22, for example, when logging into a computer system, such as a client system 18 or a remote computer system (not shown) via a client system 18.

In other embodiments, the dynamic credential authentication system 10 may include additional, fewer, or alternative devices, including those described elsewhere herein. The computing devices illustrated in FIG. 1 may be conventional computing devices, although other embodiments may have different configurations, architectures, and/or components.

The components illustrated in FIG. 1 are shown as functional components of the dynamic credential authentication system 10. In some embodiments, the individual components may be a hardware component, a software component, or a combination of hardware and software components. Some of the components may include application level software, while other components may be execution environment level components. It is contemplated that two or more of the components may operate on a single hardware platform. Each embodiment described herein may use different combinations of hardware, software, and interconnections to achieve the methods and/or techniques described herein.

While the dynamic credential authentication system 10 is shown in FIG. 1 as multiple components distributed among a plurality of computing devices, it is noted that the dynamic credential authentication system 10 may be implemented on a standalone computing device. The configuration of the dynamic credential authentication system 10 is flexible and may be implemented in various different environments and configurations without compromising any major functionality. The systems and processes are not limited to the specific embodiments described herein. In addition, components of each system and each process can be practiced independent and separate from other components and processes described herein. Each component and process can also be used in combination with other assembly packages and processes.

In the exemplary embodiment, the authentication server system 12 is a server computing device. In alternative embodiments, the authentication server system 12 may include, without limitation, a conventional desktop computing device, a laptop computing device, a netbook computing device, a tablet or slate computing device, a wireless handset, a cellular telephone, a game console, or any other type of computing device that can store and/or execute the dynamic credential module 14 thereon and communicate with client systems 18. In some embodiments, the authentication server system 12 may be implemented in a cloud computing environment. For example, and without limitation, the functionality of the authentication server system 12 disclosed herein may be provided by executing one or more applications, such as the dynamic credential module 14, in a cloud computing environment. Cloud computing typically includes providing computing services via a network connection, such as the network 20, using dynamically scalable computing resources. A cloud computing environment may be established by an enterprise and/or may be hired on an as-needed basis from a third-party provider.

The credential database 16 is a data store configured to store login credentials for the users 22. For example, and without limitation, the credential database 16 includes dynamic usernames (or userIDs), dynamic and/or static passwords associated with the dynamic usernames, and rules associated with the dynamic usernames and/or the passwords. The credential database 16 may include a single database having separated sections or partitions or may include multiple databases, each being separate from each other. In one suitable embodiment, the credential database 16 is a relational database where the dynamic usernames, passwords, and the rules are stored in tables.

The client systems 18 include one or more computing devices that a user, such as the user 22, utilizes to register and/or input login credentials, such as a username and password. As shown in FIG. 1, the client systems 18 include a user interface 24 that facilitates user interaction with the respective client system 18. For example, and without limitation, the user interface 24 enables the user 22 to input information to the client system 18 and the client system 18 to output information to the user 22 (e.g., on a display of the user interface 24). The user interface 24 includes, for example, a web browser that receives webpages from the authentication server system 12, such that the authentication server system 12 is accessible to the client systems 18 via the network 20. In some embodiments, the user interface 24 may include a discrete software program that interfaces directly with the authentication server system 12.

In the exemplary embodiment, the network 20 includes, for example and without limitation, one or more of a local area network (LAN), a wide area network (WAN) (e.g., the Internet, etc.), a mobile network, a virtual network, and/or any other suitable public and/or private network capable of facilitating communication among the authentication server system 12 and the client systems 18. The client systems 18 include any device capable of interconnecting to the network 20 (e.g., the Internet) including a conventional desktop computing device, a laptop computing device, a netbook computing device, a tablet or slate computing device, a wireless handset, a cellular telephone, a game console, or any other type of suitable web-based connectable equipment.

As disclosed herein, the authentication server system 12 includes the dynamic credential module 14. The dynamic credential module 14 includes, for example, and without limitation, a database server 26, a username (or UserID) module 28, a password module 30, a rule module 32, and an authentication module 34.

In the exemplary embodiment, the dynamic credential module 14 receives login credential data corresponding to a user, such as the user 22, from a client system 18. As described herein, the login credential data includes, for example, a dynamic username, a static or dynamic password, and one or more rules associated with the dynamic username and/or the dynamic password. The dynamic username, static or dynamic password, and one or more rules are stored, for example, on the credential database 16 for later retrieval. As is described herein, when a user 22 submits a dynamic username (e.g., m@daetz.net237) and password to the dynamic credential module 14, for example, via a client system 18, the dynamic credential module 14 attempts to match a portion of the dynamic username to the usernames stored on the credential database 16. When a match is identified (e.g., m@daetz.net), the dynamic credential module 14 searches a dynamic parameters table for the matched portion (i.e., m@daetz.net), and based on the defined rule(s) found therein, generates a test username. If the test username and the dynamic username submitted by the user 22 match, the dynamic credential module 14 searches a password table to match the received password. If the user 22 is also using a dynamic password, the matching operation proceeds in substantially the same manner as described above for a dynamic username. When the dynamic credential module 14 successfully matches the received dynamic username and password received from the user to a combination stored on the credential database 16, the user 22 may be granted access to the resource requiring the user's login credentials.

The database server 26 is connected to the credential database 16, which is configured to store information on a variety of matters, including the dynamic username, the static or dynamic password, and the one or more rules associated with the dynamic username and/or the dynamic password, as described above. In one embodiment, the credential database 16 is a centralized database stored on the authentication server system 12 and can be accessed by potential users at one of the client systems 18 by logging onto the authentication server system 12 through one of the client systems 18. In an alternative embodiment, the credential database 16 is stored remotely from the authentication server system 12 and may be a distributed or non-centralized database, as described herein.

During a user registration process, the username module 28 operates to generate a dynamic username from a fixed or static data sequence entered by a user, such as the user 22, via the user interface 24 of a client system 18. Typically, the fixed or static data sequence (or static component) can have a variable number of elements, usually with a minimum number of elements, as defined by a system administrator, where the elements generally include ASCII characters. Likewise, during the user registration process, the password module 30 operates to generate a dynamic password from a fixed or static data sequence entered by a user, such as the user 22, via the user interface 24 of a client system 18. The fixed or static data sequence can have a variable number of elements, usually with a minimum number of elements, as defined by a system administrator, where the elements generally include ASCII characters.

The rule module 32 generates a rule(s) to be associated with the static data sequence entered by the user 22 for the dynamic username and/or the dynamic password. The rule(s) is defined by one or more user selected dynamic parameter components during the registration process. As described herein, the rule(s) is stored in the credential database 16.

In the exemplary embodiment, the authentication module 34 receives from the user 22, via the user interface 24 of a client system 18, a dynamic username and/or dynamic password. The authentication module 34 parses the dynamic username and/or dynamic password into searchable elements and searches the credential database 16 for a matching portion or matching string of elements. After identifying an entry matching a portion of the dynamic username, the authentication module 34 retrieves one or more rules associated with the entry. Based on one or more rules retrieved from the credential database 16, the authentication module 34 generates a test username and/or password, compares the test usernames and/or password to the received dynamic username and/or dynamic password, and authenticates the user 22 if the caparison operation indicates a match.

User Interface

Figure 2:
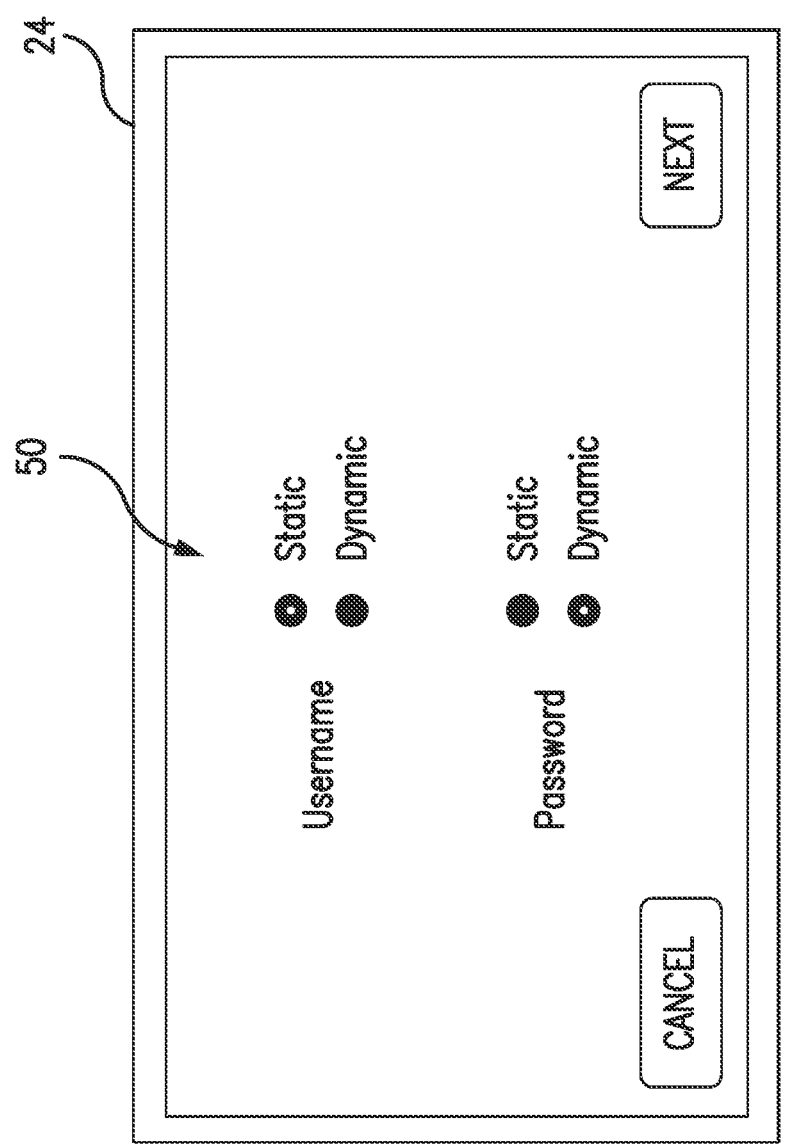
FIG. 2 is a schematic diagram of a user interface of a client system of FIG. 1, illustrating a user credential configuration screen presented to a user when registering the user for subsequent authentication.

FIG. 2 is a schematic diagram of the user interface 24 of the client system 18, illustrating a user credential configuration screen 50 presented to the user 22 (shown in FIG. 1) when registering the user 22 for subsequent authentication. In the exemplary embodiment, the credential configuration screen 50 presents an option to the user 22 for configuring a static or dynamic username and a static or dynamic password. In particular, the credential configuration screen 50 includes a selectable icon (e.g., a radio button) adjacent a "Static" and "Dynamic" label for each of a "Username" and a "Password." A "NEXT" icon and a "CANCEL" icon is presented to the user for selection, as is typical for user interface interactions. As shown in FIG. 2, the user 22 has selected the radio button indicating that a dynamic username and a static password are being registered. After the user 22 has selected the type of username and password (i.e., dynamic or static), the user 22 selects the "NEXT" icon presented on the user interface 24 to continue registration, or the "CANCEL" icon to cancel registration.

Figure 3:
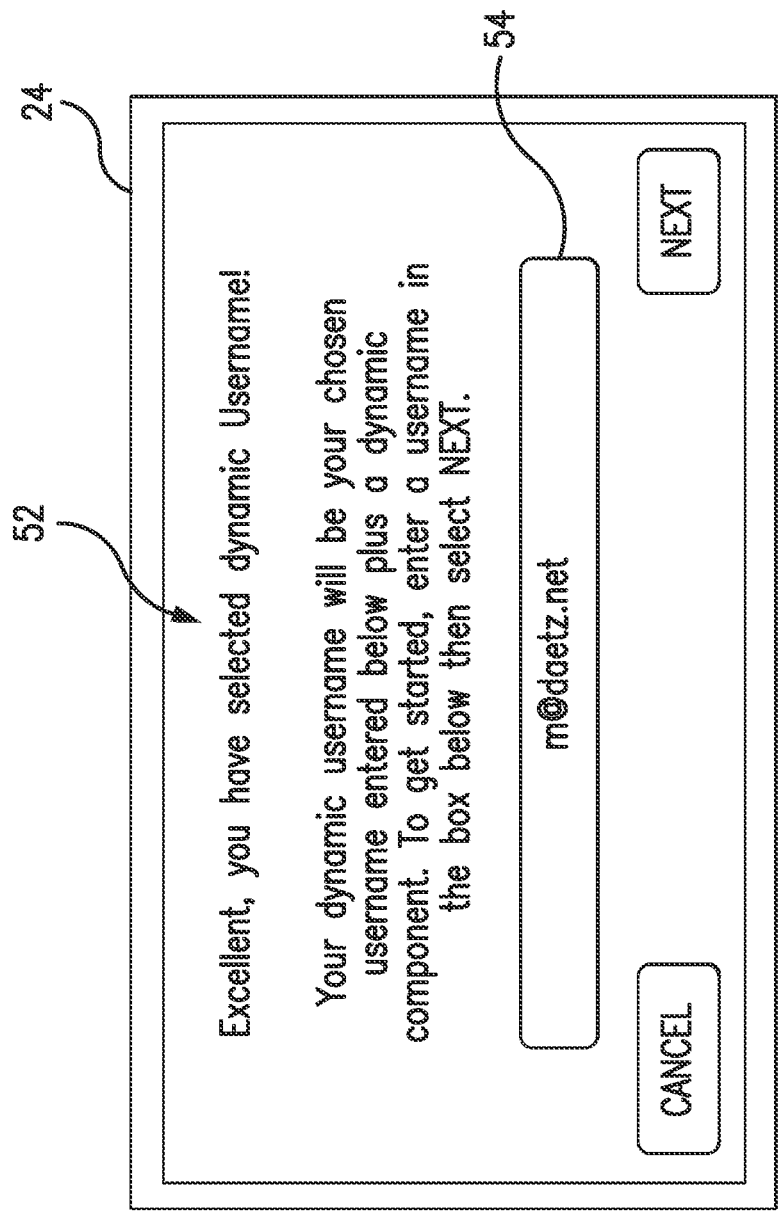
FIG. 3 is a schematic diagram of the user interface of the client system of FIG. 1, illustrating a username/password input screen presented to the user for generating the dynamic username/password.

FIG. 3 is a schematic diagram of the user interface 24 of the client system 18, illustrating a username/password input screen 52 presented to the user 22 (shown in FIG. 1) for generating the dynamic username/password. In the exemplary embodiment, the username/password input screen 52 presents instructions (e.g., visual and/or audio instructions) to the user 22 for entering a user selected username. An input box 54 is presented to the user 22 in which the user enters the username, which is generally a string of ASCII characters. It is noted that an administrator of the authentication server system 12 may require a minimum number of elements or characters of the username string and may limit or expand the acceptable elements that may be used for the username. In the exemplary embodiment, the user selected username includes the user's email address "m@daetz.net." This user supplied username is a static component of the dynamic username that is to be generated by the registration process. After the user 22 has entered the username, the user 22 selects the "NEXT" icon presented on the user interface 24 to continue registration, or the "CANCEL" icon to cancel registration.

Figure 4:
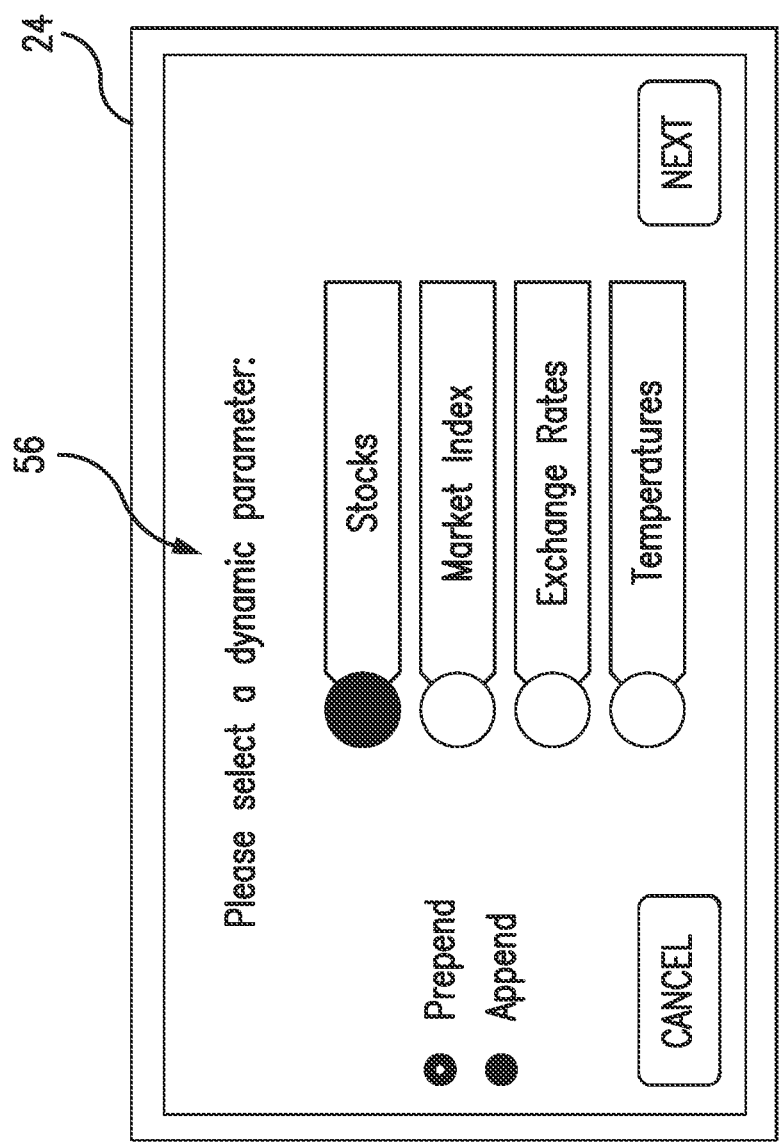
FIG. 4 is a schematic diagram of the user interface of the client system of FIG. 1, illustrating a dynamic parameter configuration screen presented to the user.

FIG. 4 is a schematic diagram of the user interface 24 of the client system 18, illustrating a dynamic parameter configuration screen 56 presented to the user 22 (shown in FIG. 1) when registering the user 22 for subsequent authentication. In the exemplary embodiment, the dynamic parameter configuration screen 56 presents an option to the user 22 for configuring a dynamic parameter component to be combined with the previously entered username (i.e., the static component). In particular, the dynamic parameter configuration screen 56 includes a selectable icon (e.g., a radio button) adjacent a "Prepend" and an "Append" label. This selection option enables to user 22 to decide whether to prepend, append, or both prepend and append the dynamic parameter component to the user selected username. In the exemplary embodiment, the user 22 has selected to singularly append the dynamic parameter component.

The dynamic parameter configuration screen 56 also includes list of user selectable dynamic parameter components. It is noted that the user selectable dynamic parameter components may include any variable that is determinable at a specific time by both the user 22 and the authentication server system 12, such that the dynamic username is determinable. For example, as shown in FIG. 4, the dynamic parameter components may include stock values, market index values, exchange rates, temperatures, locations, and the like. Furthermore, and without limitation, the dynamic parameter components may include a DAY association (e.g., day of the week+1 day, etc.), a TIME (e.g., a time of the login attempt ±an offset), a one-time use short code (e.g., a code sent to the user's mobile device via SMS), a Time-Based One Time Password (TOTP) (where an authenticator application provides a short code as the dynamic parameter component), or any other dynamic parameter component that enables the subsequent determination of the dynamic username. As such, the dynamic parameter component may be a discrete determinable parameter, such as a DAY, TIME, short code, etc., or may be a class of determinable parameters, such as stock values, that include a plurality of subcomponents that are discrete determinable parameters. The list of acceptable dynamic parameter components is predetermined by the administrator of the authentication server system 12. As shown in FIG. 4, the user 22 has selected the radio button indicating that the dynamic parameter component is "STOCKS," a class of determinable parameters. After the user 22 has selected the dynamic parameter component, the user 22 selects the "NEXT" icon presented on the user interface 24 to continue registration, or the "CANCEL" icon to cancel registration.

Figure 5:
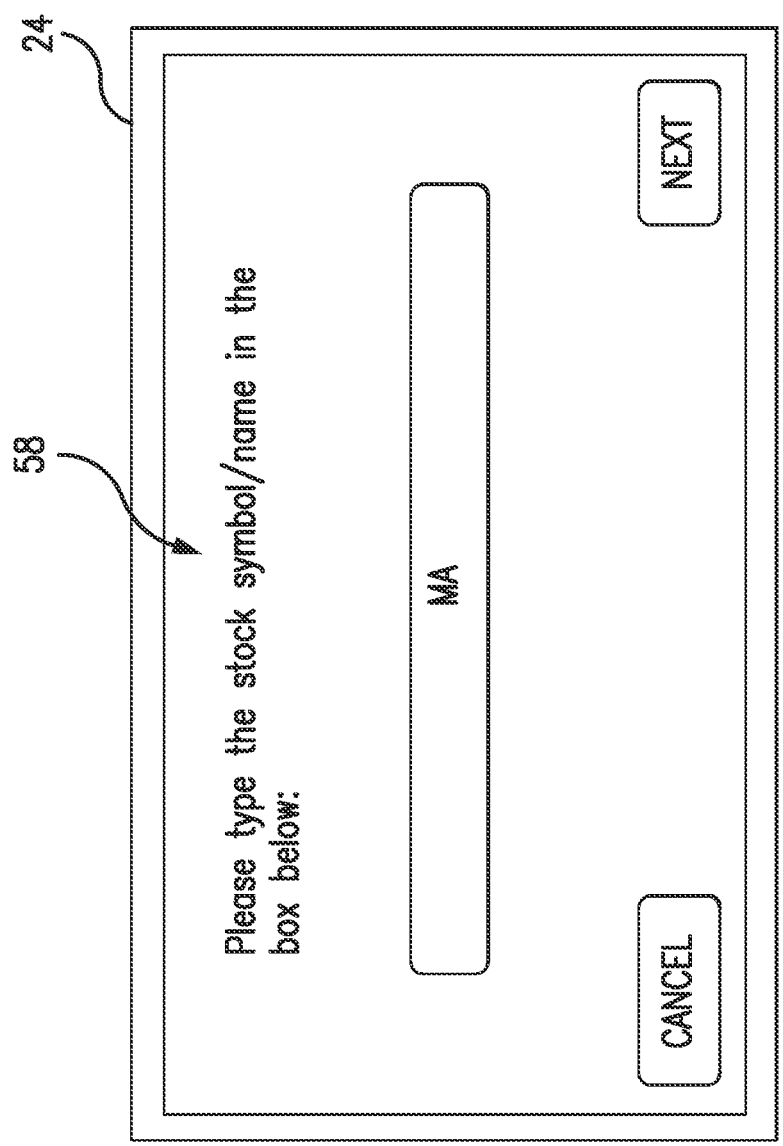
FIG. 5 is a schematic diagram of the user interface of the client system of FIG. 1, illustrating a dynamic parameter option screen presented to the user.

FIG. 5 is a schematic diagram of the user interface 24 of the client system 18, illustrating a dynamic parameter option screen 58 presented to the user 22 (shown in FIG. 1) for generating the dynamic username. In the exemplary embodiment, the dynamic parameter option screen 58 presents instructions (e.g., visual and/or audio instructions) to the user 22 for entering and/or selecting an option associated with the user selected dynamic parameter component. For example, in the exemplary embodiment, the user 22 selected STOCKS as the dynamic parameter component (See FIG. 4). The dynamic parameter option screen 58 presents an input box 62 to the user 22 in which the user enters a subcomponent of the class STOCKS, i.e., a user chosen stock symbol (e.g., the Mastercard® stock symbol MA (Mastercard is a registered trademark of Mastercard International Incorporated)). After the user 22 has entered the stock symbol, the user 22 selects the "NEXT" icon presented on the user interface 24 to continue registration, or the "CANCEL" icon to cancel registration.

In other embodiments, the dynamic parameter option screen 58 may present a selection of dynamic parameter component options that are predetermined by an administrator of the authentication server system 12. For example, rather than having the user 22 enter a user chosen stock symbol, the dynamic parameter option screen 58 may present a list of stock symbols for the user 22 to select from and/or may contain a default stock symbol that can be changed by the user 22. Furthermore, for other dynamic parameter components, the options may be appropriately presented to the user 22 for selection, input, etc. For example, for a Time-Based One Time Password (TOTP) for use with an authentication App, the dynamic parameter option screen 58 may present to the user 22 a QR code that can be read by the user's authentication App to synchronize the TOTP. Likewise, for a one-time use short code via SMS, the user 22 may be requested to enter a mobile number to receive the one-time use short code. After the user 22 has completed the dynamic parameter options setup, the user 22 selects the "NEXT" icon presented on the user interface 24 to continue registration, or the "CANCEL" icon to cancel registration.

Figure 6:
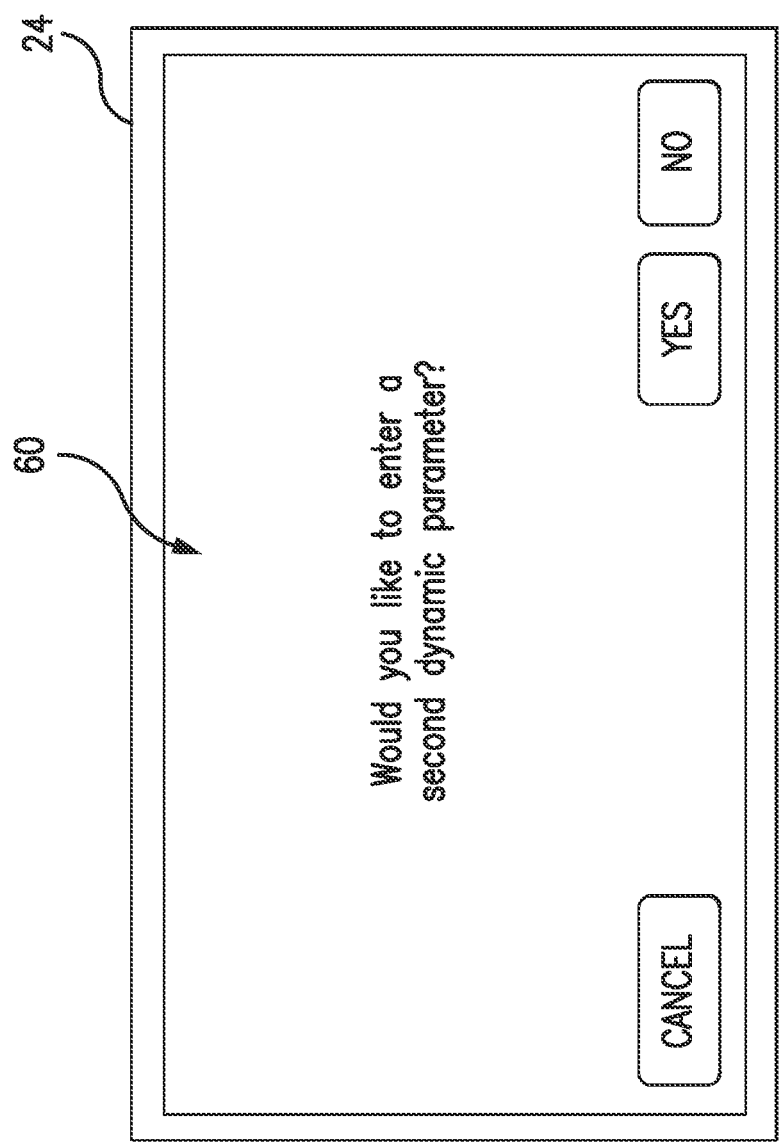
FIG. 6 is a schematic diagram of the user interface of the client system of FIG. 1, illustrating an additional dynamic parameter screen presented to the user.

FIG. 6 is a schematic diagram of the user interface 24 of the client system 18, illustrating an add additional dynamic parameter screen 60 presented to the user 22 (shown in FIG. 1) when registering the user 22 for subsequent authentication. In the exemplary embodiment, the additional dynamic parameter screen 60 presents an option to the user 22 for adding an additional dynamic parameter component to be combined with the previously entered username/dynamic parameter component combination. In particular, the additional dynamic parameter screen 60 includes a selectable "YES" icon that takes the user 22 back to the dynamic parameter configuration screen 56 to add additional dynamic parameter components (in accordance with the steps described above). Furthermore, the additional dynamic parameter screen 60 includes a "NO" which continues the registration, and the "CANCEL" icon to cancel registration.

Figure 7:
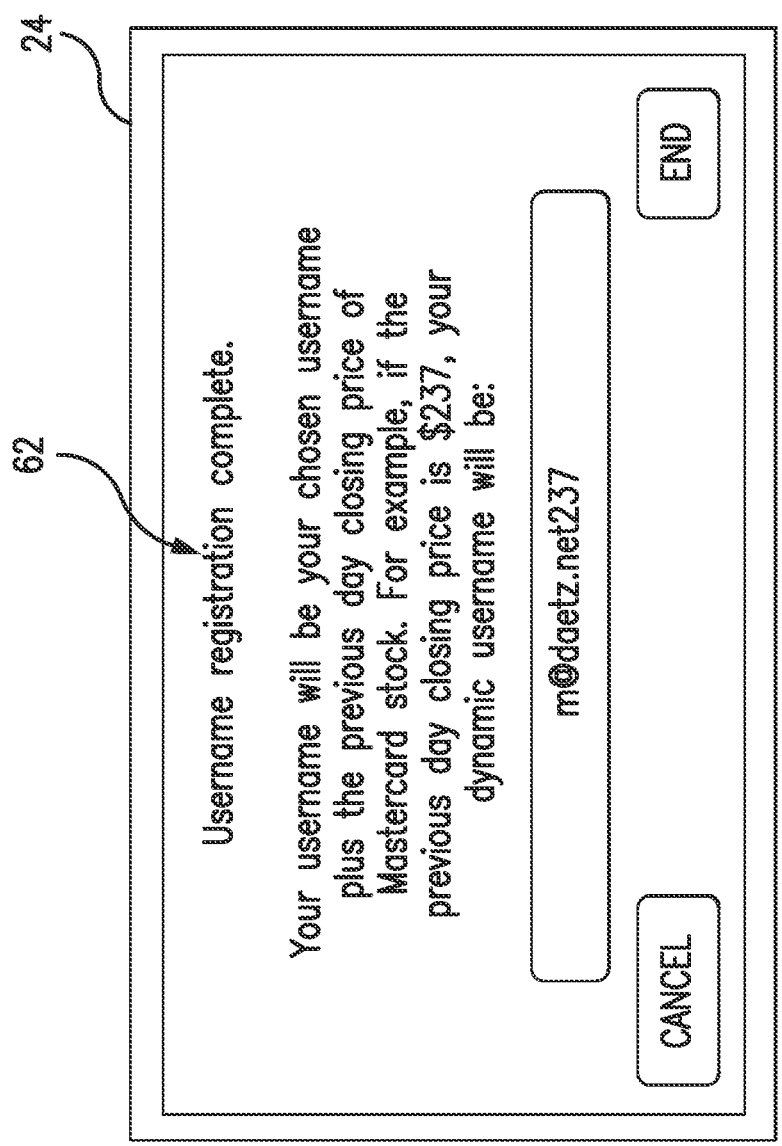
FIG. 7 is a schematic diagram of the user interface of the client system of FIG. 1, illustrating a dynamic username verification screen presented to the user.

FIG. 7 is a schematic diagram of the user interface 24 of the client system 18, illustrating a dynamic username verification screen 62 presented to the user 22 (shown in FIG. 1) for generating the dynamic username. In the exemplary embodiment, the dynamic username verification screen 62 presents the dynamic username (e.g., visual and/or audio) to the user 22. The dynamic username verification screen 62 presents to the user an explanation of the dynamic username based on the user's selection and an example of the dynamic username. For example, in the exemplary embodiment, the user 22 selected Mastercard stock as the dynamic parameter component (See FIG. 6). The dynamic username verification screen 62 presents the dynamic username "m@daetz.net237" with an explanation that the dynamic username is the user's chosen username plus the users selected Mastercard stock value from the previous day appended thereto. The user 22 selects the "END" icon presented on the user interface 24 to finish registration, or the "CANCEL" icon to cancel registration. When the user 22 selects to complete the registration process, the authentication server system 12 stores the static component of the dynamic username (as described in FIG. 3 above) along with a rule for generating the dynamic password.

In some embodiments, the user 22 may be taken back to the username/password input screen 52, where the user can input a password. For example, if the user selected a static password, the user may input the password into the username/password input screen 52 and the registration process may end. If the user 22 selected a dynamic password, the user 22 may complete substantially the same registration process described above in reference to FIGS. 2-7 for registering a dynamic password.

Figure 8:
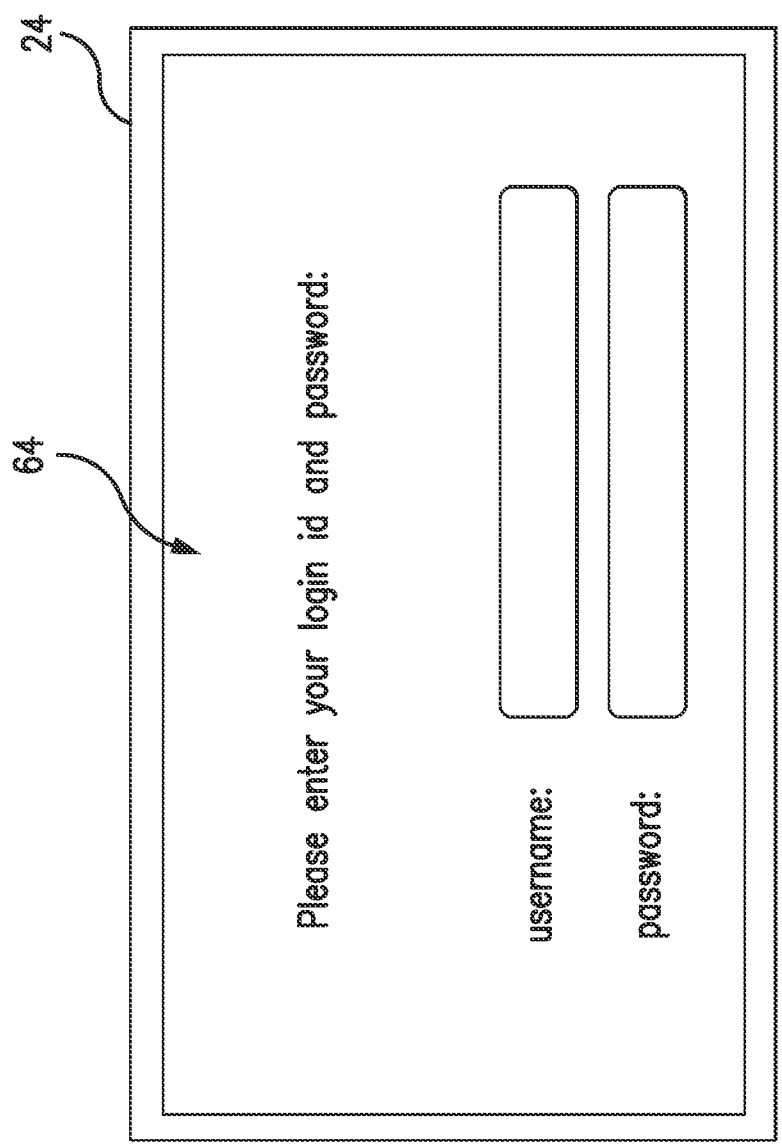
FIG. 8 is a schematic diagram of the user interface of the client system of FIG. 1, illustrating a login screen presented to the user for using the dynamic username and/or password.

FIG. 8 is a schematic diagram of the user interface 24 of the client system 18, illustrating a login screen 64 presented to the user 22 (shown in FIG. 1) for using the dynamic username and/or password. The user 22 (shown in FIG. 1) logs into the authentication server system 12 through the login screen 64 of the user interface 24 using the dynamic username and/or password registered during the registration process, as shown in FIGS. 2-7. For example, and without limitation, the user 22 enters the dynamic username into the box adjacent the "username" label, and the password into box adjacent the "password" label. After the user submits the dynamic username and the password via the login screen 64, the authentication server system 12 uses the information to authenticate the user 22 via the authentication module 34.

Exemplary Computer-Implemented Methods

FIGS. 9-13 illustrate various computer-implemented methods for generating and authenticating a dynamic username for use in login credentials for a user of a computing system, in accordance with embodiments of the present disclosure, as described herein. The operations described with respect to each of the computer-implemented methods below may be performed in the order shown in figures or may be performed in a different order. Furthermore, some operations may be performed concurrently as opposed to sequentially. In addition, some operations may be optional.

While operations within the computer-implemented methods are described below regarding the authentication server system 12 (shown in FIG. 1), the computer-implemented methods may be implemented using any other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Figure 9:
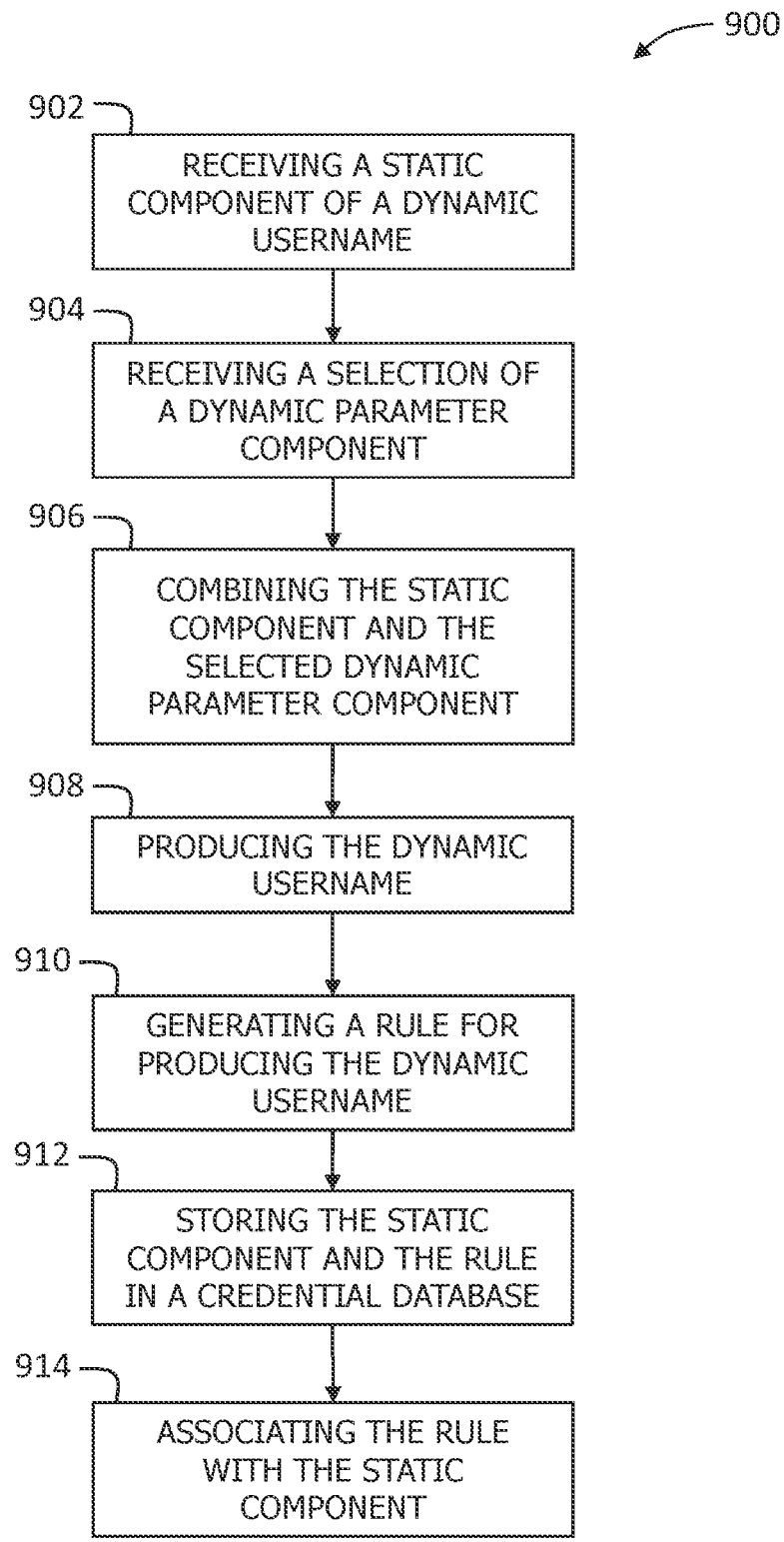
FIG. 9 is a flowchart illustrating an exemplary computer-implemented method for generating a dynamic username for use in login credentials for a user, such as the user shown in FIG. 1, in accordance with one embodiment of the present disclosure.

FIG. 9 is a flowchart illustrating an exemplary computer-implemented method 900 for generating a dynamic username for use in login credentials for a user, such as the user 22 shown in FIG. 1, in accordance with one embodiment of the present disclosure. The computer-implemented method 900 is described below, for ease of reference, as being executed by exemplary devices and components introduced with the embodiments illustrated in FIGS. 1-8, 14, and 15. In one embodiment, the computer-implemented method 900 may be implemented by the user 22 using a computing device, such as the client system 18 (shown in FIG. 1). In the exemplary embodiment, the computer-implemented method 900 relates to generating and storing a dynamic username using, for example, the authentication server system 12 (shown in FIG. 1).

The method 900 includes, in operation 902, receiving a static component of a dynamic username, for example, from the user 22 via a client system 18 coupled in communication with the authentication server system 12. More specifically, the username module 28 (shown in FIG. 1) receives the static component of a dynamic username from the client system 18. For example, and without limitation, in one embodiment, the user 22 inputs the static component of the dynamic username via the user interface 24 (shown in FIGS. 1-8). The client system 18 transmits the static component to the username module 28 via the network 20.

In operation 904, the method 900 includes receiving a selection of a dynamic parameter component of the dynamic username. For example, and without limitation, the user 22 selects a dynamic parameter component to include with the static component previously submitted via the user interface 24. At operation 906, the username module 28 combines the static component and the selected dynamic parameter component in a predetermined order to produce, at operation 908, the dynamic username based on the static component and the dynamic parameter component. For example, and without limitation, the username module 28 receives from the user 22 an instruction to combine the static component and the selected dynamic parameter component in a certain order, as described below with respect to FIG. 11. The username module 28 produces the dynamic username by combining the static component and the selected dynamic parameter component in accordance with the received instruction.

At operation 910, the authentication server system 12, and more particularly, the rule module 32, generates a rule for producing the dynamic username. For example, and without limitation, the rule module 32 generates a rule for storing in the credential database 16 (shown in FIG. 1), instructing the authentication server system 12 to combine the static component and the dynamic parameter component(s) in the order defined by the user 22.

At operation 912, the rule module 32 stores the static component and the generated rule in the credential database 16. In particular, in the exemplary embodiment, the rule module 32 passes the static component and the generated rule to the database server 26 for storage. The database server 26 communicates with the credential database 16 and stores the static component and the rule as retrievable data for subsequent use by the authentication server system 12. Furthermore, at operation 914, the rule module 32 instructs the database server 26 to associate, within the credential database 16, the rule with the static component.

Figure 10:
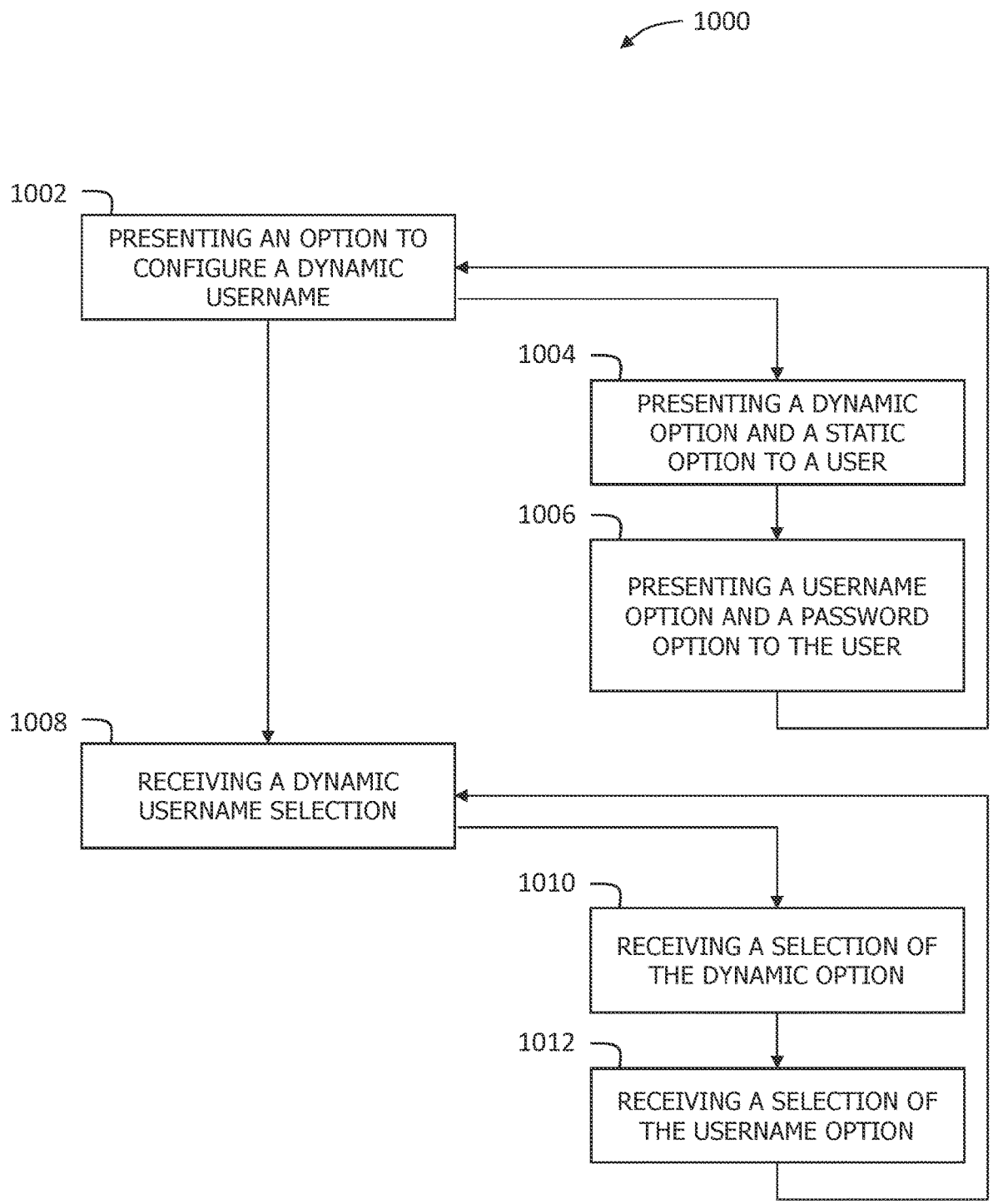
FIG. 10 is a flowchart illustrating an exemplary computer-implemented method for receiving the static component of the dynamic username, as shown in the method of FIG. 9.

FIG. 10 is a flowchart illustrating an exemplary computer-implemented method 1000 for receiving the static component of the dynamic username, as shown in operation 902 of FIG. 9, in accordance with one embodiment of the present disclosure. In the exemplary embodiment, at operation 1002, an option to configure a dynamic username is presented to a user, such as the user 22. More particularly, the user credential configuration screen 50 (shown in FIG. 2) is presented to the user 22 (shown in FIG. 1) when registering the user 22 for subsequent authentication. As shown in operation 1004, the credential configuration screen 50 presents an option to the user 22 for configuring a static or dynamic username and, as shown in operation 1006, a static or dynamic password. In particular, the credential configuration screen 50 includes a first pair of mutually exclusive, user-selectable icons, with each respective icon associated with a user-selectable option including a dynamic option and a static option as indicated in operation 1004. Furthermore, the credential configuration screen 50 includes a second pair of mutually exclusive, user-selectable icons, with each respective icon associated with a user-selectable option including a username option and a password option.

At operation 1008, a dynamic username selection is received. In the exemplary embodiment, operation 1008 includes receiving a selection of the dynamic option at operation 1010 and receiving a selection of the username option at operation 1012. More specifically, receiving the selection of the dynamic option includes receiving a selection of the dynamic option of the first pair of mutually exclusive, user-selectable icons and receiving the selection of the username option of the second pair of mutually exclusive, user-selectable icons.

Figure 11:
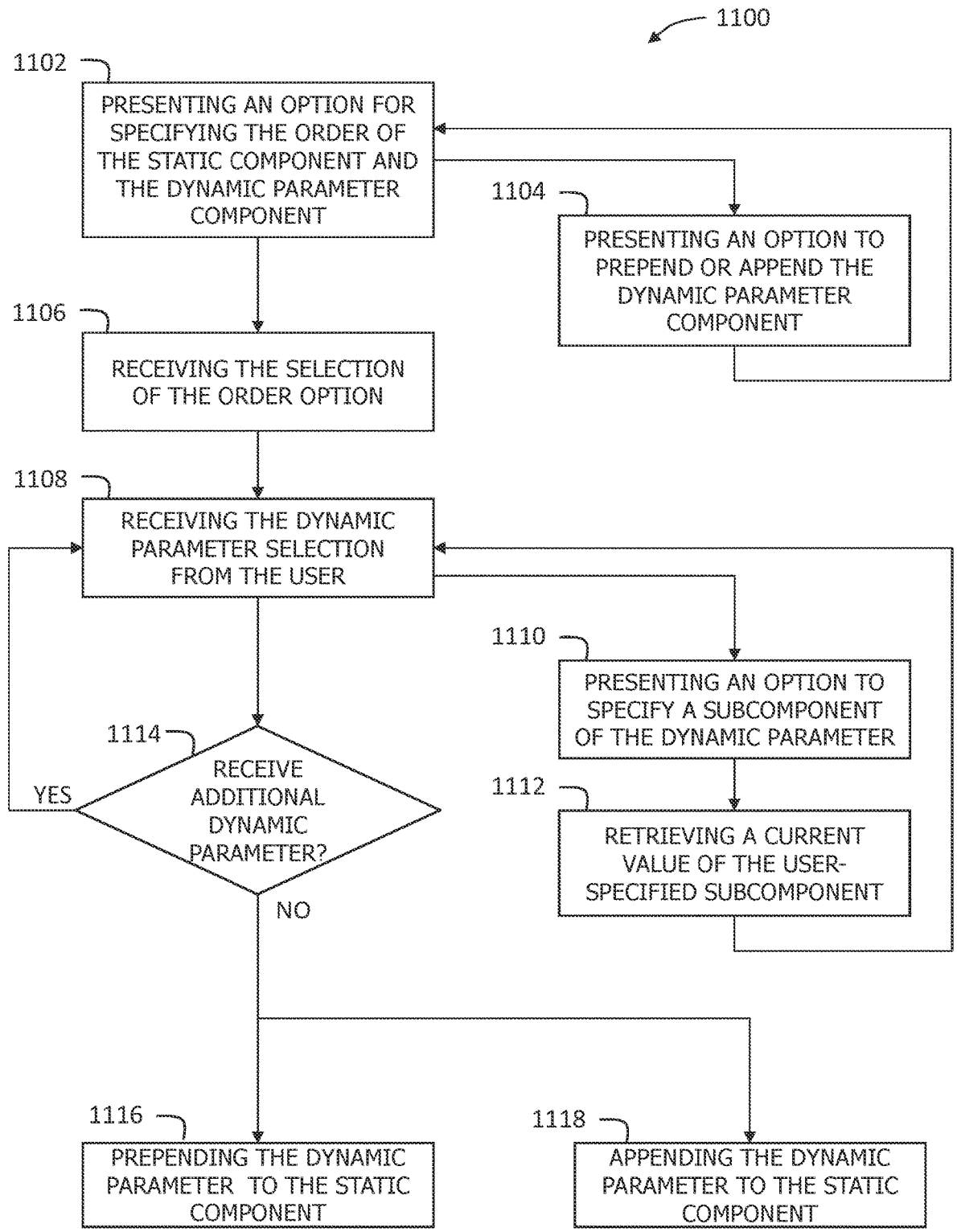
FIG. 11 is a flowchart illustrating an exemplary computer-implemented method for receiving the selection of the dynamic parameter component and combining the static and dynamic components, as shown in the method of FIG. 9.

FIG. 11 is a flowchart illustrating an exemplary computer-implemented method 1100 for receiving the selection of the dynamic parameter component, shown in operation 904 of FIG. 9, and combining the static and dynamic components, shown in operation 906 of FIG. 9, in accordance with one embodiment of the present disclosure. In the exemplary embodiment, at operation 1102, an option for specifying the order of the static and dynamic components of the dynamic username is presented to a user, such as the user 22. More particularly, at operation 1104 the dynamic parameter configuration screen 56 (shown in FIG. 4) presents to the user 22 a pair of options for specifying the predetermined order of the static component and the selected dynamic parameter component, including a first option to prepend the dynamic parameter component to the static component and a second option to append the dynamic parameter component to the static component. As described herein, the user 22 may select both the first option and the second option, thereby enabling the dynamic parameter component to be both prepended and append to the static component. In a preferred embodiment, the first and second options are mutually exclusive.

At operation 1106, the selection of one or more of the first option or the second option is received. At operation 1108, the dynamic parameter component selection from the user 22 is received. In particular, the dynamic parameter configuration screen 56 includes list of user-selectable dynamic parameter components. The user 22 selects one of the user-selectable dynamic parameter components for configuring the dynamic username. At operation 1110, the user 22 is presented with an option to specify a subcomponent of the selected dynamic parameter component. Responsive to the user selecting a subcomponent of the dynamic parameter component, at operation 1112, the authentication server system 12 retrieves a value for the subcomponent. For example, if the subcomponent includes a specific stock symbol, the authentication server system 12 retrieves a current value of the indicated stock using, for example, the network connection 20.

At operation 1114, the user 22 is presented with an option to input an additional dynamic parameter component. For example, in the exemplary embodiment, the add additional dynamic parameter screen 60 (shown in FIG. 6) is presented to the user 22 when registering the user 22 for subsequent authentication. The add additional dynamic parameter screen 60 includes, for example, a selectable "YES" icon that takes the user 22 back to the dynamic parameter configuration screen 56 to add an additional dynamic parameter component (in accordance with operations described above). It is noted that the additional dynamic parameter component may be prepended, appended, or both prepended and appended to the previously defined combination of static and dynamic components. Furthermore, the additional dynamic parameter screen 60 includes a "NO" which continues the registration process.

The method 1100 combines the static component and the selected dynamic parameter component as discussed above at operation 906 of FIG. 9. Specifically, at operation 1116, the static component and the dynamic parameter component are combined by prepending the dynamic parameter component to the static component of the username in response to receiving a selection from the user 22 to prepend the dynamic parameter component. Likewise, in response to receiving a selection from the user 22 to append the dynamic parameter component, at operation 1118, the method 1100 combines the static component and the selected dynamic parameter component by appending the dynamic parameter component to the static component of the username. If the user 22 selects to both prepend and append the dynamic parameter component, both operations 1116 and 1118 are performed.

Figure 12:
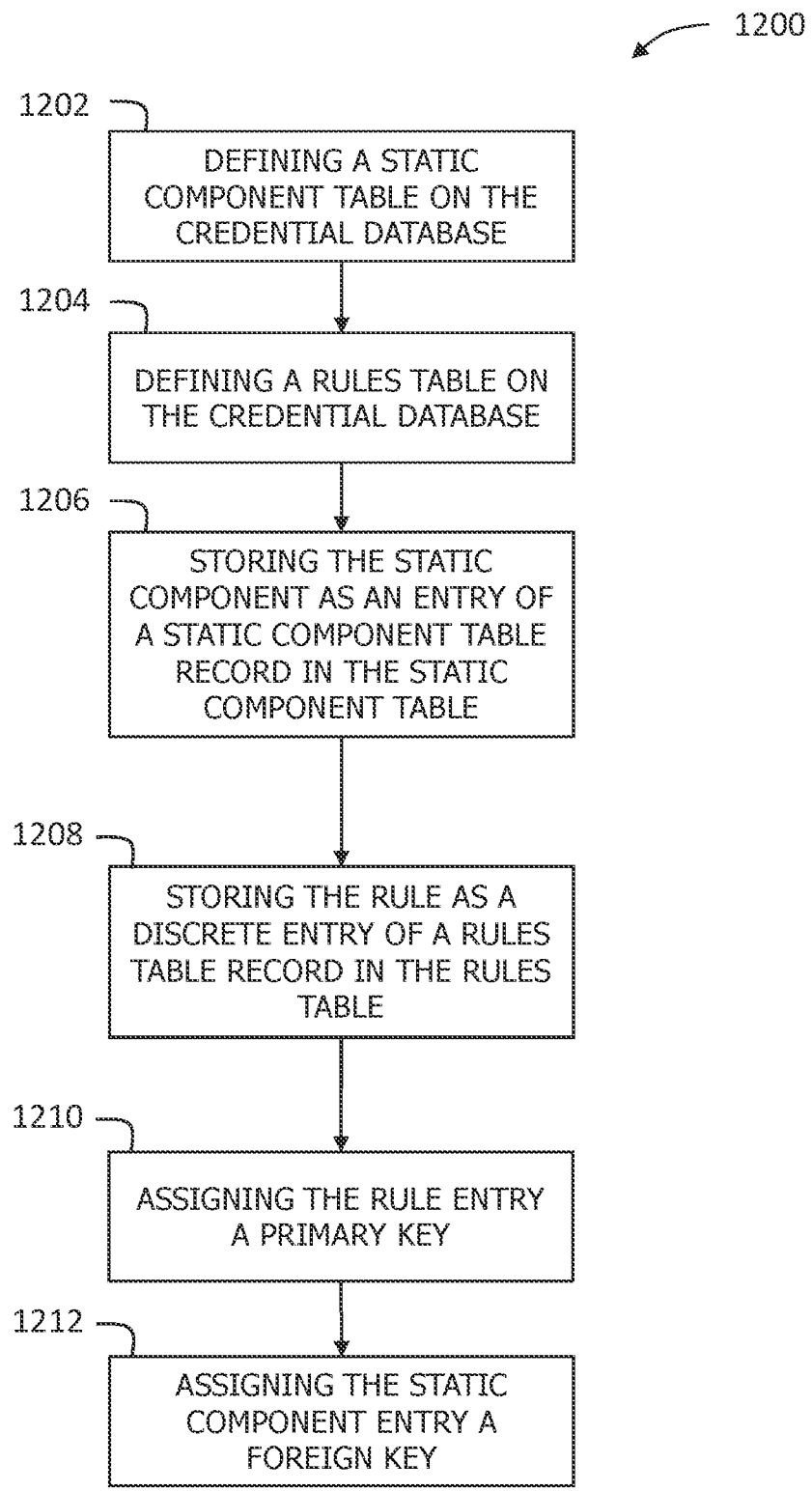
FIG. 12 is a flowchart illustrating an exemplary computer-implemented method for storing the static component and the rule in the credential database shown in FIG. 1, and associating the rule with the static component, as shown in the method of FIG. 9.

FIG. 12 is a flowchart illustrating an exemplary computer-implemented method 1200 for storing the static component and the rule in the credential database 16 (shown in FIG. 1) and associating, within the credential database 16, the rule with the static component, as indicated in operations 912 and 914 of FIG. 9. In the exemplary embodiment, the method 1200 includes at operation 1202, defining a static component table (not shown) on the credential database 16, the static component table including one or more static component table records (not shown). At operation 1204, the method 1200 includes defining a rules table (not shown) on the credential database 16, the rules table including one or more rules table records (not shown). At operation 1206, the method 1200 includes storing the static component as a discrete entry of a static component table record in the static component table. Furthermore, at operation 1208, the method includes storing the rule as a discrete entry of a rules table record in the rules table.

At operation 1210, the method 1200 includes assigning the rule entry a primary key. Typically, the rows or entries of data stored in tables, for example, the rules table (e.g., a referenced table), are associated with an identifier for easier access and identification. The identifier assigned to a data value or set of data values may be unique to the associated data with respect to other identifiers used for all of the data stored in the table. As used herein, such an identifier is referred to as a "primary key."

At operation 1212, the method 1200 includes assigning the static component entry a foreign key. The rows or entries of data stored in, for example, the static component table (e.g., a referencing table), are associated with an identifier that may reference the associated data in the rules table. Such an identifier is referred to as a "foreign key" in the static comment table. The foreign key is a field in the static component table that is the primary key in the rules table. As such, the data in the static component table references specific rules or data entries in the rules table.

Figure 13:
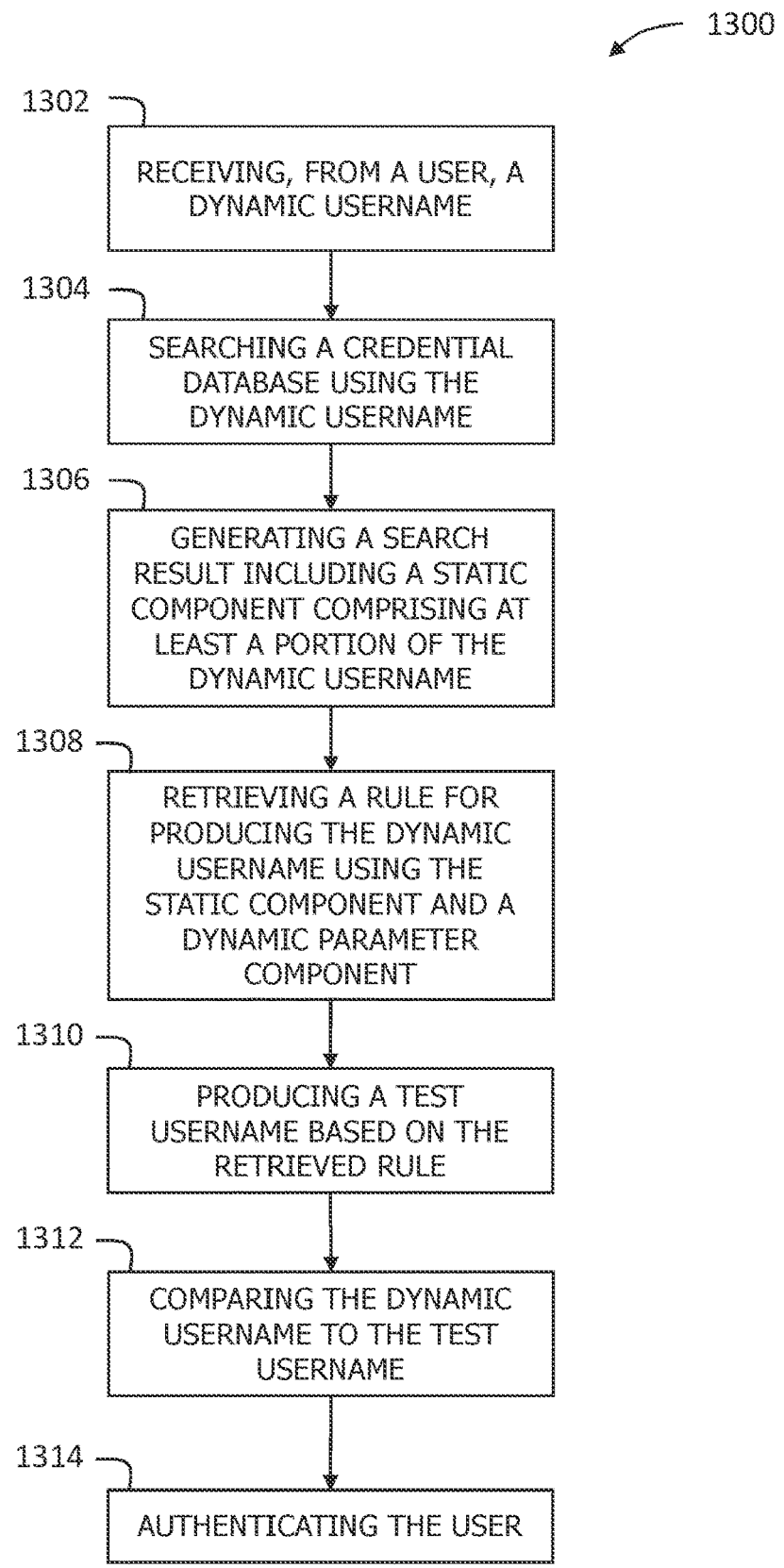
FIG. 13 is a flowchart illustrating an exemplary computer-implemented method for authenticating a user, such as the user shown in FIG. 1, using a dynamic username as part of his or her login credentials, in accordance with one embodiment of the present disclosure.

FIG. 13 is a flowchart illustrating an exemplary computer-implemented method 1300 for authenticating a user, such as the user 22 shown in FIG. 1, using a dynamic username as part of his or her login credentials, in accordance with one embodiment of the present disclosure. The computer-implemented method 1300 is described below, for ease of reference, as being executed by exemplary devices and components introduced with the embodiments illustrated in FIGS. 1-8, 14, and 15. In one embodiment, the computer-implemented method 1300 may be implemented by the user 22 using a computing device, such as the client system 18 (shown in FIG. 1). In the exemplary embodiment, the computer-implemented method 1300 relates to authenticating a dynamic username using, for example, the authentication server system 12 (shown in FIG. 1).

The method 1300 includes, in operation 1302, receiving a dynamic username, for example, from the user 22 via a client system 18 coupled in communication with the authentication server system 12. More specifically, the authentication module 34 (shown in FIG. 1) receives dynamic username from the client system 18. For example, and without limitation, in one embodiment, the user 22 inputs the dynamic username via the user interface 24 (shown in FIGS. 1-8). The client system 18 transmits the dynamic username to the authentication module 34 via the network 20.

In operation 1304, the method 1300 includes searching a credential database, such as the credential database 16 (shown in FIG. 1), using the dynamic username. For example, and without limitation, the authentication module 34 parses the dynamic username into searchable elements and searches the credential database 16 for an entry having a matching portion or matching string of elements. In the exemplary embodiment, the credential database 16 includes a rules table including one or more rules table records. Each of the rules table records include a primary key and a rule entry of a rule for producing a dynamic username. In addition, the credential database 16 includes a static component table including one or more static component table records. Each of the static component table records includes a foreign key and a static component entry of a static component of a dynamic username. The foreign key references a primary key of the rules table, which is associated with a specific rule for generating a dynamic username.

In one embodiment, the search operation 1304 includes searching the static component table and identifying a static component table record having a static component entry that matches at least a portion of the dynamic username. The foreign key of the identified static component record is retrieved, and the referenced rule is identified in the rule table based on a matching primary key.

A search result is generated at operation 1306. The search result includes a static component of the dynamic username. The static component includes a matching portion or matching string of elements making up at least a portion of the dynamic username received in operation 1302.

At operation 1308, after identifying an entry matching a portion of the dynamic username (i.e., the static component), the authentication module 34 retrieves one or more rules associated with the entry. The rule identifies a dynamic parameter component and an instruction for appending and/or prepending the dynamic parameter component to the static component generating a test username. Based on one or more rules retrieved from the credential database 16, at operation 1310, the authentication module 34 generates the test username. More specifically, the authentication module 34 uses the identified matching portion or matching string of elements of the dynamic user name (i.e., a static component of the dynamic username) and retrieves a value for the dynamic parameter component identified by the rule. The static component and the value for the dynamic parameter component are combined as specified by the rule. The result is the test username.

At operation 1312, the authentication module 34 compares the test username to the received dynamic username, and if the caparison operation indicates a match, the authentication module 34 authenticates the dynamic username at operation 1314. In some embodiments, the method 1300 includes receiving, from the user 22, a password associated with the dynamic username. The authentication module 34 retrieves, from the credential database 16, a stored password associated with the dynamic username, and if the password and the stored password indicate a match, the user 22 is authenticated.

As described herein, if the user 22 is also using a dynamic password, the generation of the dynamic password proceeds in substantially the same manner as described above for the dynamic username in method 900. Furthermore, the authenticating of the dynamic password proceeds in substantially the same manner as described for the dynamic username in method 1300. When the dynamic credential module 14 successfully matches a received dynamic username and dynamic password received from the user 22 to a combination stored on the credential database 16, the user 22 may be granted access to the resource requiring the user's login credentials.

Exemplary Computing Systems

Figure 14:
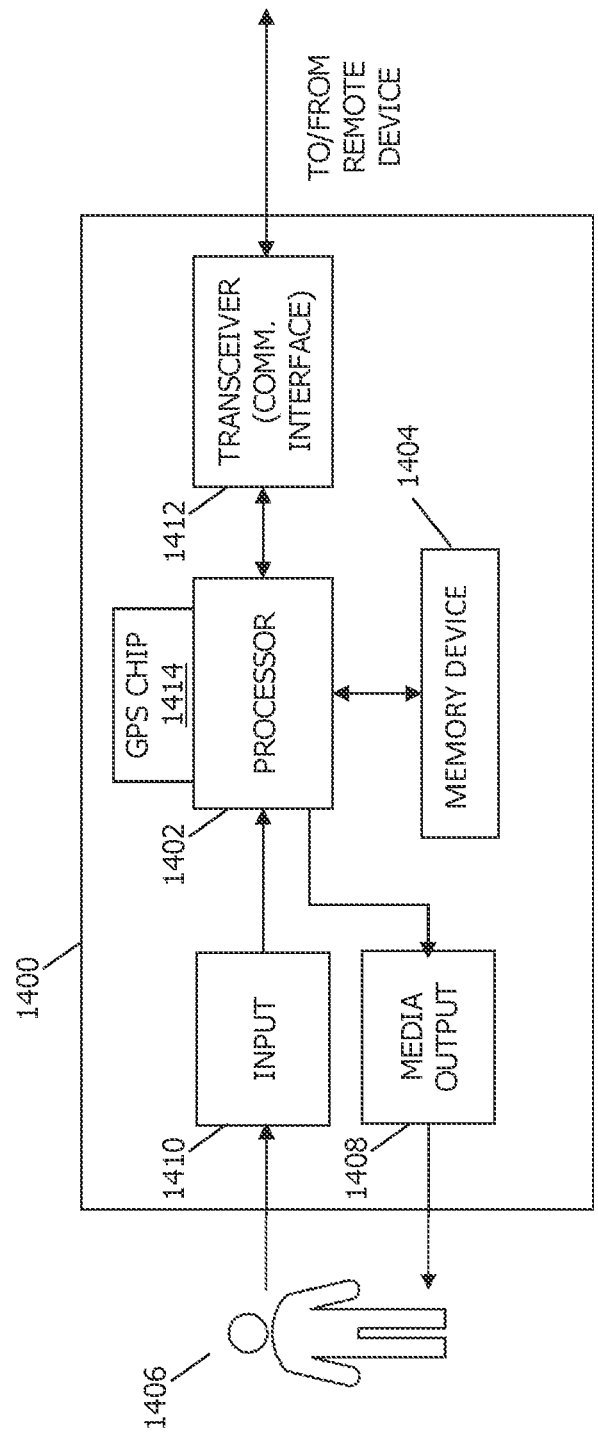
FIG. 14 is an example configuration of a computer system used by a user, such as the user shown in FIG. 1, to register and/or input a dynamic username for user authentication.

FIG. 14 is an example configuration of a computer system 1400 used by a user, such as the user 22 (shown in FIG. 1), to register and/or input a dynamic username for user authentication. The computer system 1400 may include, for example, the client systems 18 shown in FIG. 1.

In the example embodiment, the computer system 1400 includes one or more processors 1402 for executing instructions. In some embodiments, executable instructions are stored in a memory device 1404. The processor 1402 may include one or more processing units arranged, for example, in a multi-core configuration. The memory device 1404 is any device allowing information, data, executable instructions, and/or written works to be stored and retrieved. The memory device 1404 includes one or more computer readable media.

In one example embodiment, the processor 1402 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

A location of the computer system 1400 can be obtained through conventional methods, such as a location service (e.g., global positioning system (GPS) service) in the computer system 1400, "ping" data that includes geotemporal data, from cell location register information held by a telecommunications provider to which the computer system 1400 is connected, and the like. For example, in one suitable embodiment, a GPS chip 1414 can be part of or separate from the processor 1402 to enable the location of the computer system 1400 to be determined.

The computer system 1400 also includes at least one media output component 1408 for presenting information to a user 1406. The media output component 1408 is any component capable of conveying information to the user 1406. In some embodiments, the media output component 1408 includes an output adapter such as a video adapter and/or an audio adapter. The output adapter is operatively coupled to the processor 1402 and operatively connectable to an output device such as a display device, a liquid crystal display (LCD), organic light emitting diode (OLED) display, or "electronic ink" display, or an audio output device, such as an integrated speaker and the like.

In one example embodiment, the media output component 1408 includes an integrated display, which can include, for example, and without limitation, a liquid crystal display (LCD), an organic light emitting diode (OLED) display, or an "electronic ink" display. In some embodiments, the integrated display may optionally include a touch controller for support of touch capability. In such embodiments, the computer system 1400 may detect the user's presence by detecting that the user 1406 has touched the integrated display on the computer system 1400.

In some embodiments, the computer system 1400 includes an input device 1410 for receiving input from the user 1406. The input device 1410 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both an output device of the media output component 1408 and the input device 1410, as described above. The computer system 1400 may also include a transceiver 1412 (broadly, a communication interface), which is communicatively connectable to the network 20 (shown in FIG. 1) and/or a remote device such as the authentication server system 12 (shown in FIG. 1) in any manner. The transceiver 1412 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 1404 are, for example, computer readable instructions for providing a user interface to the user 1406 via the media output component 1408 and, optionally, receiving and processing input from the input device 1410. A user interface may include, among other possibilities, a web browser and/or a payment application (e.g., a digital wallet). Web browsers enable users, such as the user 1406, to display and interact with media and other information typically embedded on a web page or a website from a merchant. A payment application allows the user 1406 to interact with a merchant to perform electronic transactions.

Figure 15:
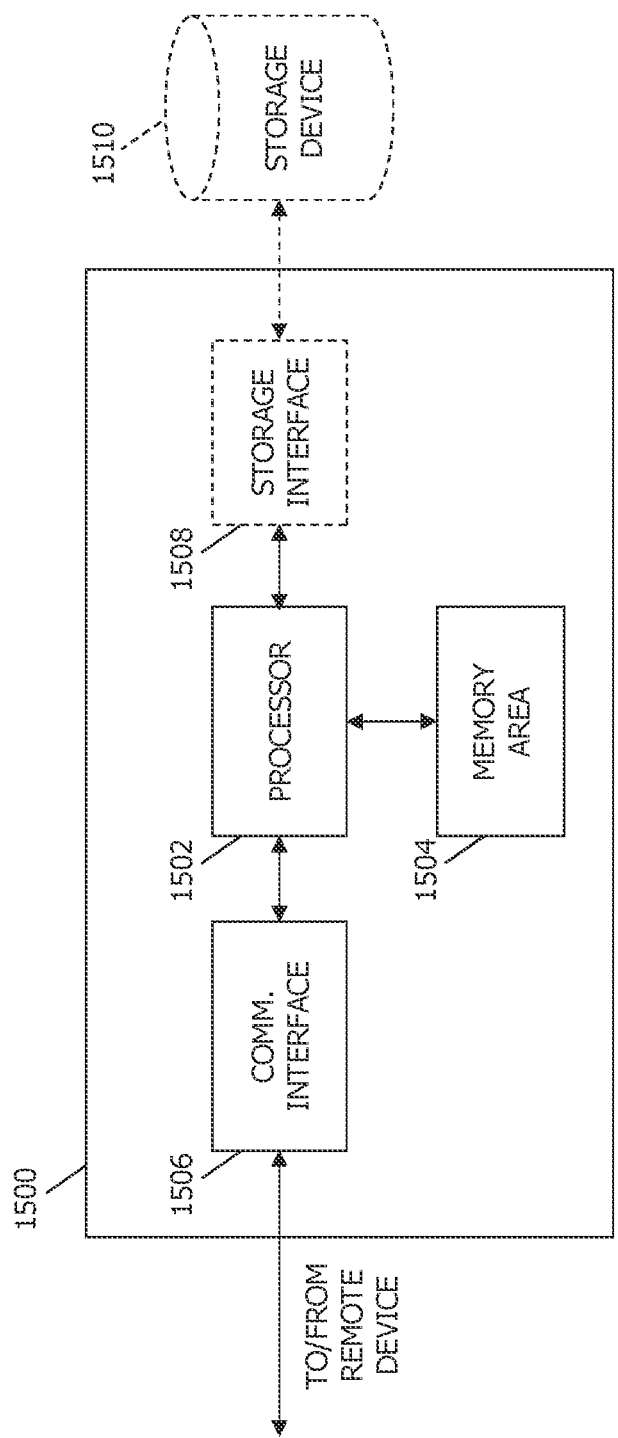
FIG. 15 is an example configuration of a server system, such as the authentication server system shown in FIG. 1.

FIG. 15 is an example configuration of a server system 1500, such as the authentication server system 12 (shown in FIG. 1). In the example embodiment, the server system 1500 includes a processor 1502 for executing instructions. The instructions may be stored in a memory area 1504, for example. The processor 1502 includes one or more processing units (e.g., in a multi-core configuration) for executing the instructions, for example, in parallel operations. The instructions may be executed within a variety of different operating systems on the server system 1500, such as UNIX, LINUX, Microsoft Windows®, etc. More specifically, the instructions may cause various data manipulations on data stored in a storage device 1510. It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

In one example embodiment, the processor 1502 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

The processor 1502 is operatively coupled to a communication interface 1506 such that the server system 1500 can communicate with a remote device such as a computer system 1400 or another server system 1500. For example, the communication interface 1506 may receive communications from the computer system 1400 via the Internet (e.g., the network 20), as illustrated in FIG. 1.

The processor 1502 is operatively coupled to the storage device 1510. The storage device 1510 is any computer-operated hardware suitable for storing and/or retrieving data. In some embodiments, the storage device 1510 is integrated in the server system 1500 and is like the credential database 16 (shown in FIG. 1). In other embodiments, the storage device 1510 is external to the server system 1500. For example, the server system 1500 may include one or more hard disk drives as the storage device 1510. In other embodiments, the storage device 1510 is external to the server system 1500 and may be accessed by a plurality of server systems 1500. For example, the storage device 1510 may include multiple storage units such as hard disks or solid-state disks in a redundant array of inexpensive disks (RAID) configuration. The storage device 1510 may include a storage area network (SAN) and/or a network attached storage (NAS) system.

In some embodiments, the processor 1502 is operatively coupled to the storage device 1510 via a storage interface 1508. The storage interface 1508 is any component capable of providing the processor 1502 with access to the storage device 1510. The storage interface 1508 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1502 with access to the storage device 1510.

The memory area 1504 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as an FPGA, to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceivers, memory devices, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

What is claimed is:

1. A method comprising:
    receiving, from a user, a dynamic username;
    searching a credential database using the dynamic username;
    generating a search result, the search result including a static component of the dynamic username, the static component comprising at least a portion of the dynamic username;
    retrieving, from the credential database, a rule for producing the dynamic username using the static component and a dynamic parameter component;
    producing a test username from the static component and the dynamic parameter component based on the retrieved rule;
    comparing the dynamic username to the test username; and
    authenticating the dynamic username based on the dynamic username matching the test username, wherein the credential database comprises:
        a rules table including one or more rules table records, one of the rules table records including a primary key and a rule entry of the rule for producing the dynamic username, and a static component table including one or more static component table records, one of the static component table records including a foreign key and a static component entry of the static component of the dynamic username, the foreign key referencing the primary key of the rules table.

2. The method in accordance with claim 1 further comprising:
    receiving, from the user, a password associated with the dynamic username; and
    retrieving, from the credential database, a stored password associated with the dynamic username, the authenticating operation further comprising authenticating the user based on a comparison of the password to the stored password indicating a match.

3. The method in accordance with claim 1 further comprising: parsing the dynamic username into searchable elements, the searching operation comprising searching the credential database using the searchable elements.

4. The method in accordance with claim 1, the operation of searching the credential database comprising: searching the static component table, and identifying a static component table record having the static component entry that matches at least a portion of the dynamic username.

5. The method in accordance with claim 4 further comprising: identifying, from the static component table record, the foreign key referencing the primary key; and identifying, from the rules table, the rule entry referenced by the foreign key.

6. The method in accordance with claim 1, the operation of producing the test username comprises: retrieving a value for the dynamic parameter component identified in the rule, and combing the static component and the value of the dynamic parameter component in an order defined by the rule.

* * * * *